(12) United States Patent
Iannaccone et al.

(10) Patent No.: US 11,907,257 B2
(45) Date of Patent: *Feb. 20, 2024

(54) SYSTEM AND METHOD FOR DUPLICATING AN APPLICATION STATE

(71) Applicant: ROYAL BANK OF CANADA, Toronto (CA)

(72) Inventors: Philip Iannaccone, New York, NY (US); Walter Michael Pitio, Morganville, NJ (US); James Brown, New York, NY (US)

(73) Assignee: ROYAL BANK OF CANADA, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,974

(22) Filed: Oct. 3, 2022

(65) Prior Publication Data
US 2023/0021468 A1 Jan. 26, 2023

Related U.S. Application Data

(63) Continuation of application No. 15/284,431, filed on Oct. 3, 2016, now Pat. No. 11,461,359.

(Continued)

(51) Int. Cl.
*G06F 16/00* (2019.01)
*G06F 16/27* (2019.01)
(Continued)

(52) U.S. Cl.
CPC ............... *G06F 16/27* (2019.01); *G06F 8/38* (2013.01); *G06F 9/451* (2018.02); *H04L 67/1095* (2013.01)

(58) Field of Classification Search
CPC . G06F 16/27; G06F 8/38; G06F 9/451; H04L 67/1095
See application file for complete search history.

(56) References Cited

U.S. PATENT DOCUMENTS

| 5,971,580 A | 10/1999 | Hall et al. |
| 11,461,359 B2 | 10/2022 | Iannaccone et al. |

(Continued)

OTHER PUBLICATIONS

WIPO, Written Opinion and International Search Report for PCT Application No. PCT/CA2016/051151 dated Dec. 7, 2016.

*Primary Examiner* — Diedra McQuitery
(74) *Attorney, Agent, or Firm* — Norton Rose Fulbright Canada LLP

(57) ABSTRACT

A computer system and computer-implemented method for duplicating an application state are provided, the method including: recording one or more point-in-time characteristics generated by prior user inputs at one or more user interface elements, the one or more point-in-time characteristics associated with a first application state of a first application instance; transferring the one or more point-in-time characteristics to the provisioned memory resources for generating the second application state; generating a second application instance based on the one or more point-in-time characteristics; configuring the second application state based on the one or more point-in-time characteristics to duplicate the first application state of the first application instance; and storing the prior user inputs in a journal, wherein the journal is configured to enable reproduction of a state of a plurality of modified states of the first application instance.

20 Claims, 11 Drawing Sheets

Related U.S. Application Data

(60) Provisional application No. 62/235,862, filed on Oct. 1, 2015.

(51) Int. Cl.
  *G06F 9/451* (2018.01)
  *G06F 8/38* (2018.01)
  *H04L 67/1095* (2022.01)

(56) References Cited

U.S. PATENT DOCUMENTS

| | | |
|---|---|---|
| 2003/0197735 A1 | 10/2003 | Woltzen |
| 2005/0081105 A1 | 4/2005 | Wedel et al. |
| 2005/0234979 A1 | 10/2005 | Martineau et al. |
| 2007/0054627 A1* | 3/2007 | Wormald .............. G06F 9/4856 455/70 |
| 2007/0150836 A1 | 6/2007 | Deggelmann et al. |
| 2008/0313282 A1 | 12/2008 | Warila et al. |
| 2011/0106776 A1 | 5/2011 | Vik |
| 2012/0054640 A1 | 3/2012 | Nancke-Krogh |
| 2012/0102396 A1* | 4/2012 | Arksey ................ G06T 11/206 715/273 |
| 2012/0290657 A1 | 11/2012 | Parks et al. |
| 2012/0297007 A1* | 11/2012 | Burckart ................ H04L 67/02 709/227 |
| 2013/0120439 A1* | 5/2013 | Harris .................... G11B 27/34 345/619 |
| 2014/0280486 A1* | 9/2014 | Seay ....................... H04L 67/02 709/203 |
| 2015/0081701 A1 | 3/2015 | Lerios et al. |
| 2015/0135206 A1* | 5/2015 | Reisman ................ H04H 20/93 725/18 |
| 2016/0173617 A1* | 6/2016 | Allinson ................ H04L 67/148 709/227 |
| 2016/0335356 A1 | 11/2016 | Desineni et al. |
| 2017/0039233 A1 | 2/2017 | Gauthier et al. |
| 2017/0046180 A1* | 2/2017 | Desineni .................. G06F 9/54 |

\* cited by examiner

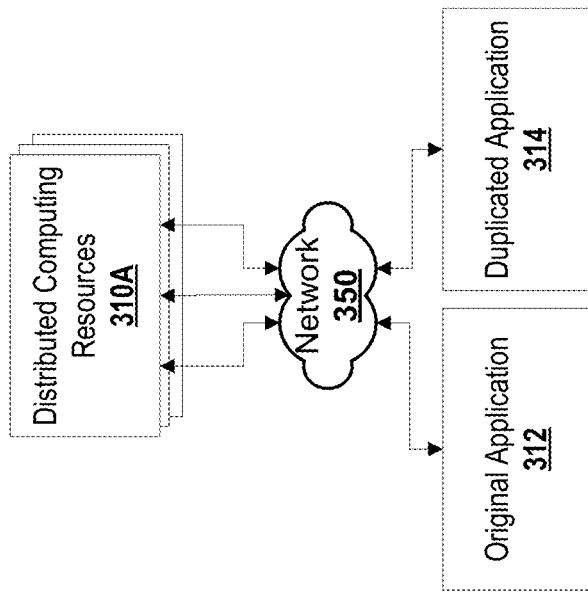
FIG. 3C
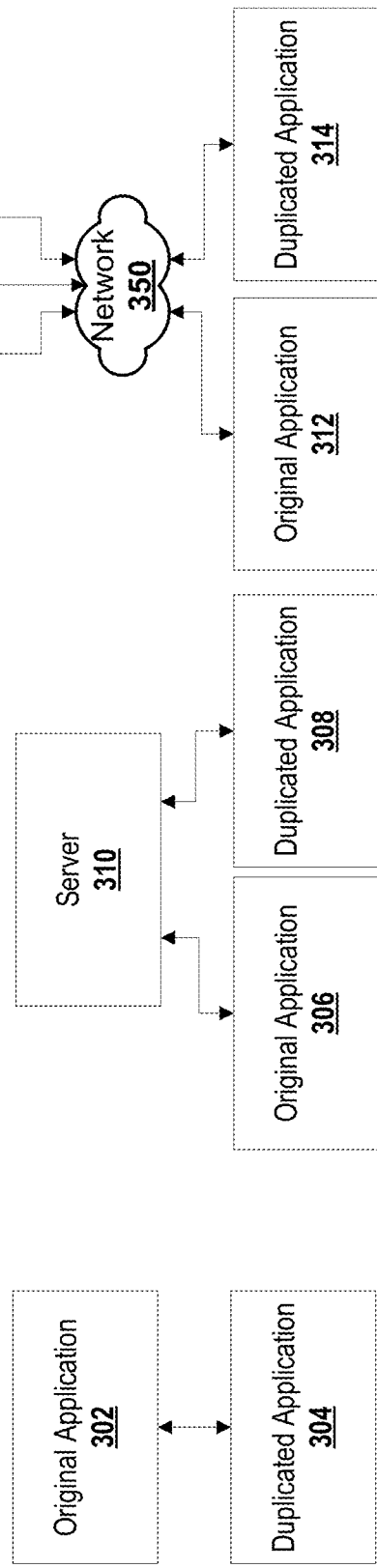
FIG. 3B
FIG. 3A

SYSTEM AND METHOD FOR DUPLICATING AN APPLICATION STATE

CROSS REFERENCE TO RELATED APPLICATIONS

This application is a Continuation of U.S. patent application Ser. No. 15/284,431, filed on Oct. 3, 2016, which claims priority to U.S. Provisional Patent Application No. 62/235,862, filed on Oct. 1, 2015, the entire contents of both of which are herein incorporated by reference.

FIELD

Embodiments relate to user interfaces for computer software applications, and more particularly to management of user interfaces for computer software applications.

INTRODUCTION

Computing devices are regularly controlled by users to perform multiple tasks at once. For example, displaying a spreadsheet in one application window of a graphical user interface, while simultaneously displaying a word processor document in another application window.

Windows may be positioned side-by-side, overlapping, or on or across multiple display devices in order to allow a user to view the contents of multiple windows simultaneously. Multiple instances of web browser applications may also be used to display content in multiple web browser tabs or windows.

In particular, being able to view information from a multitude of web browser windows may be desirable, or on different devices that share a common account or credentials.

New computer capabilities to control multi-windowed user interfaces may offer improvements in creating or organizing application states.

SUMMARY

There is provided a computer-implemented method for duplicating an application state, the method including: recording one or more point-in-time characteristics of an original application state of an application, the recording including: parsing underlying code for the application to identify (i) a set of state variables that together define the original application state and (ii) a set of logical breadcrumbs identifying a pre-determined number of past actions that led to the original application state; establishing one or more logical anchor points based on the set of state variables; provisioning memory resources to support a duplicate application state; on the provisioned memory resources, initiating a copy of the application; transferring the one or more point-in-time characteristics to the provisioned memory resources, the transferring including: configuring the copy of the application using the one or more point-in-time characteristics to regenerate the original application state on the copy of the application.

In another aspect, the recording of the one or more point-in-time characteristics comprises generating a universal resource locator string (URL) adapted to store at least (i) application information and (ii) one or more status information data elements; the application information is interpreted during the initiating to determine which application to initiate; and the one or more status information data elements are interpreted during the configuring to convey state information to the copy of the application.

In another aspect, the application includes at least one application subcomponent.

In another aspect, the application subcomponent consists of a component selected from the group including of Flash, HTML5, AJAX, PHP, and ActiveX components.

In another aspect, the application state is provided in relation to at least one of a group including a Sankey graph, a bubble graph, and a transaction view.

In another aspect, the application state is duplicated to a second device from an original application state that is hosted on a first device.

In another aspect, the application state is hosted within a secure session, the method further including: duplicating one or more security credentials from the original application state to the copy of the application.

In another aspect, the logical anchor points are representative of one or more customizations to one or more graph display components.

In another aspect, each of the logical anchor points are representative of a corresponding plurality of one or more customizations to one or more graph display components.

In another aspect, each of the logical anchor points are updated periodically to match modifications to the original application state over a period of time.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

BRIEF DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 3A is illustrative of an example direct application to application transfer, which may occur on a single device or between multiple devices, according to some embodiments.

FIG. 3B is illustrative of an architecture where a server serves as the intermediary between an original application and a duplicated application, according to some embodiments.

FIG. 3C is similar to FIG. 3B except that a network is used in communicating with a set of distributed computing resources (e.g., a "cloud" implementation), which act in concert as an intermediary for provisioning of the duplicated application, according to some embodiments.

DETAILED DESCRIPTION

Figure 1:
FIG. 1 is illustrative of a method for duplicating a windowed application view, according to some embodiments.

When viewing or interacting with a computer software application, such as a web browser, through a graphical user interface ("GUI"), it may be desirable to view the same or different parts of the application simultaneously. In some contexts, it may also be desirable to "conference" in another individual or use another device to view the application simultaneously.

In some embodiments, a type of "conference button" is described wherein a user or some event initiates the task of creating a snapshot of the window/screen and of the underlying application. Embodiments relate to a graphical user interface (GUI). A GUI manages the interaction between a computer system and a user through graphical elements such as windows on a display. A GUI manages the interaction between a computer system and a user through graphical elements such as windows on a display. Windows display various types of outputs for various computer processes and may contain controls to accept user input for those processes.

A technical problem in duplicating an application, is that numerous elements of information (e.g., settings, parameters, variables) regarding the status of what was viewed in the first window is not normally maintained into the second window. Applications may include, but are not limited to, web browser-based applications, software programs, mobile applications, among others. For example, a web browser may be configured to constantly display the current URL. A user or program is not able to "package up" a URL such that it further contains information indicative of the state or states of the application. For example, a user may have a view or application configured in a particular manner—e.g., selected visual parameters, selections, application of secured access credentials, current state, breadcrumbs, and may wish to duplicate such an application.

In the case of a web browser approach, this can be presently accomplished by creating a second instance of the browser, such as by creating a new tab or window of the browser. The web address, or uniform resource locator ("URL") being accessed in the first web browser window may be copied, either automatically or manually into the new tab or window. However, any current view settings or state of any web application, such as a Flash™, HTML5, or Java™ application, being accessed in the first browser window do not get propagated to the second window.

Types of web applications may include audio/video players, web conferencing applications, data visualization applications, input forms, games, etc. In order to view such a web application and its data in the second window in the same state as the first window, the user must recreate all of the actions initially used to achieve the state of the web application in the first window. Such a process may require numerous duplicative user inputs, and may take longer than the time spent achieving the web application state of just the first web browser window.

A web browser displays the current URL. If a user tries to copy a URL, replicate a window in a browser, or send the URL to another machine or user, the new window that is opened up can only convey the state of the URL of the original window. Any application state information is typically lost. Updating URLs dynamically in a regular browser whenever anything changes on the screen is not practical because it would be the equivalent of refreshing the entire browser window every time any changed. This is not feasible for any type of sophisticated graphics interface where there is a high volume of information and detail in the image, or if the screen image is dynamic and changing continually whether it is a video image, or a simulation, game, etc.

However, if the user copies the URL at the top of the bar to replicate a window in a browser, or sends the URL to another machine or user, the new window that is opened up can only convey the state of the URL of the original window. Accordingly, any application state information is typically lost. Updating URLs dynamically in a regular browser whenever anything changes on the screen is not practical because it would be the equivalent of refreshing the entire browser window every time any changed.

This is not feasible for any type of sophisticated graphics where there is a large volume of information and detail in the image, or if the screen image is dynamic and changing continually whether it is a video image, or a simulation, game, etc. For example, the applications may be interacting with large, pre-processed data sets that would be un-wieldy to refresh or to re-request information from various backend data storage facilities.

In some embodiments, an improved GUI is provided through a configured computer-implemented system that provides an explicit process that, for example, can be triggered by the user clicking a mouse, hitting a button or key, or an event trigger like a timer, event counter, or application event (e.g., pressing the "conference button").

When this trigger occurs, the application generates a new "URL", that is different than the one that is currently being displayed, that conveys the state information of the application. This new URL may be designated as a replication URL (or "RURL") and the original URL that is in use by the original browser or application can be called the "OURL".

This state information can be conveyed in the RURL string itself, or it can also involve generating state data in the form of files or messages. To facilitate this using a URL modification, the RURL string can identify the files or messages (e.g., by identifier or topic or other message identifier). In some embodiments, the underlying state information associated with the application (or a subset thereof) may be monitored such that a generated RURL contains the most up to date state information. In some embodiments, the monitoring is constant. In other embodiments, the monitoring is periodic.

When the RURL is passed to a new browser window, another instance of the application, or a completely different computing device or even a different user, the RURL contains all of the necessary information to regenerate the state of the application assuming that the new machine or user has access to the underlying application, all of the underlying data, and whatever files or messages were used to store the state of the application on the original window. In some embodiments, a limited subset of state information is provided from which the state may be regenerated.

Duplicating and/or otherwise replicating an application using a RURL, among other implementations, may include, for example, recording one or more point-in-time characteristics of an original application state of an application. The application may, for example, include programs that include a complex set of information stored, for example, in the form of variables, states, secured access credentials, certificates, among others.

Duplicating or otherwise replicating the application state may advantageously be conducted such that a seamless experience is reproduced wherein a user is able to conduct tasks on the duplicated application as if the user is conducting the task on the original application. By permitting the duplication and/or replication, the computing device's ability to display information, interact with the user and interact with the data is improved.

The system may be configured to, for example, create a functional copy of a window or screen—new browser window, etc., on the same machine, create a copy of a window or screen on a different machine or for a different user, and/or create some type of log, journal, or backup of the application session, so that a user can restore a previous state of the window or application.

The information may include, for example, Mouse position, state of parameters in a tag: value format, or even a JSON type file or message, size and dimensions of the screens and windows, location of windows on the screen, color or screen "look and feel" options, zoom factor, where screen/window is centered, etc., wallpaper, screen patterns, etc., and/or an identification/version of the underlying application. These may be defined, for example, using common fields, and to deploy this mechanism, there can be application specific or custom fields in the RURL. There may also be standard cross-application fields that may be used in common to generate the basis for a sort of a common application replication language.

In some embodiments, the original window or application does not actually have to change its current OURL. It can continue using the OURL, or it can be configured to set the current OURL to the RURL it just generated.

The duplicated application, for example, may be provided on a same device (e.g., as a new window in the case of a windowed application), or a new device that may be, in some embodiments, in a same or a different form factor or type of device. In the event that the new device is of a different type than the original device housing the original application, duplicating or otherwise replicating the application may require modifications or transformations of the replication information such that the duplicated application is suited for its environment. Such modifications or transformations may include, but are not limited to, resizing, recoloring, modification of inputs/outputs, and modified driver linkages.

In an example scenario, the user may look to begin some travel and would like to duplicate the application on the user's mobile device. In some embodiments, the duplication and/or replication is triggered (e.g., by selecting or pressing a "conference button"), and the process begins to initiate a corresponding application on the new device (the mobile device in this case).

In accordance with some embodiments, in various aspects, methods, systems, and machine-executable instruction logic for duplicating a state or states of a graphical user interface or application is provided. There may be provided a computer system comprising a display, an input device (e.g., mouse, trackball, touchscreen, etc.), and one or more data processors coupled to a memory containing computer processing instructions.

The computer system may include one or more client or server computers in communication with one another over a near-field, local, wireless, wired, or wide-area computer network, such as the Internet. The one or more computer servers may include local, remote, cloud based or software as a service platform (SAAS) servers. The computer system may comprise a desktop, laptop or mobile computer. In accordance with some embodiments, in a graphical user interface displayed on a display device of the computer system, there may be provided an input mechanism associated with a windowed view of an application (e.g., a first window).

The input mechanism may comprise a button or touchable area that when activated initiates the spawning or creation of a duplicate view of the application (e.g., a second window).

A tool for initiating and invoking the replication or duplication of an application may be configured for parsing underlying code for the application to identify (i) a set of state variables that together define the original application state and (ii) a set of logical breadcrumbs or navigational waypoints identifying a pre-determined number of past actions that led to the original application state.

These state variables, for example, may be organized in the form of logical anchor points based on the set of state variables, and the logical anchor points may be dynamically chosen in view of the application being replicated or duplicated. For example, a trading system platform showing various Sankey diagrams for flow may be presenting information based on certain "anchor" or landmark data sets that are used in determining, for example, how information is to be presented to the user (e.g., what order, what information to show/hide, which trade flows are of interest, how to color coordinate or otherwise emphasize the flows of interest, among others). Other graphs are possible, including, for example, bubble graphs, transactional views, etc.

These anchor/landmark data sets may, if taken together, be sufficient to fully describe the state of the application such that it may be reliably duplicated or replicated onto a new device or new application.

Following the duplication or replication, the user may be able to conduct a similar analysis but starting to take a different trajectory from an original analysis (e.g., scenario analysis), or be able to utilize the new application on-the-go on a new device. The user may also be able to invoke a duplication/replication such that another user on another device is able to conduct an analysis in the same state that the original application was in (e.g., to share or verify results), among others.

For example, the application architecture can support different modes of window replication as they apply to the application: each new window is run on a separate/independent instance of the application whether on the same or different PC/server, the windows share the same instance of the application on the same PC/server, the new window is provided on a different server and is capable of accessing/sharing the same application instance used by the original window on a different PC/server.

Similarly, the models may be applicable for data that could be stored on a shared database, etc., and the applications and windows can be configured so that changes to data made in the copy of the window get applied to the same application or data as the original window; or alternately to an independent copy.

Where security and/or access control is a consideration, if an application requires a login, then the window copy application can be configured in a number of ways:

When a window is created on the same PC/server as the original, and it shares the same application, then it can be configured to require a login from the user, or it can be configured to automatically login using the same credentials as the original window (and effectively login automatically), If a separate or independent instance of the application is used by the copy of the window whether on the same PC/server or a different one, it can also be configured to require a login, or it can use the same credentials as the original window (and effective login automatically).

Encryption can be used in addition to compression/truncation. Typically you would compress/truncate the data first and then encrypt it. This way the RURL could only be used by someone who has the corresponding encryption credentials. This can be used to facilitate access controls to applications/data and security.

There are also multiple modes of application access when using a different instance of an application when a window is copied:

In some embodiments, the new instance of the application may be running already. This is useful when sharing RURLs with other user accounts/devices to make sure that the other destination device possesses the necessary applications, licenses, access permissions, etc.

Alternately, when bringing up the copy of the window, the new instance of the application gets started automatically. In some instances, this may provide convenient and automatic operation of the system but assumes that the recipient of the RURL has the necessary application environment available.

A series of RURLs can be generated to create snapshots of an application session. The user can then go back to any of them to restore a previously viewed state of the application. These previous states can be saved, potentially named by the user, time stamped automatically and/or indexed. The user can then see a directory or log of these. These backup RURLs can be generated explicitly, through a user command, mouse click, or key stroke. Or alternately by a timer, or even trigger (like whenever the user switches window views, or search parameters, etc.).

Another technique that can be used to store the state of an application is a journal, sometimes referred to as a replay log. The idea of the journal or replay log is that you can start at a known state of the application, and then go through the journal which contains all user operations, keys strokes, and mouse movements, and effectively replays the user session to end up at any arbitrary point in the session. This approach can be very powerful, but it has the drawback that the replay can take a large amount of time, in some cases almost as much time as the original user session.

A hybrid technique can be used where the system generates both snapshots as well as journals. When navigating to go to any arbitrary previous state, the system would apply the last snapshot found prior to the desired restore state, and then the journal can be applied from that point (rather than from the start of the session).

In some embodiments, the system may be configured to record (e.g., save) a "snapshot" of the state of the system, application, webpage, etc. at regular time intervals, or when particular events have occurred (e.g., particular actions have been initiated by the user).

Less significant changes in application may also be tracked through journaling/logging. When numerous application states are automatically recorded, it can be difficult to locate and restore a particular state.

An approach could be to quickly playback, either forward or backwards in time, all of the event snapshots, allowing the user to stop the playback and manually toggle through them.

The journal or log may also be manually reviewed by the user to look for particular keywords, and then upon locating a particular action in the log, the user may ask the system to revert the application to the state represented by that point in the log, which may be loaded, or recreated from the closest stored snapshot and stepped back/forward through the logged actions to recreate the requested state.

Other methods of viewing/navigating the collection of saved states are also provided. For example, instead of scrolling through each state, or the log file, particular actions that were logged may be represented on a timeline or branching tree, to show, optionally with a visual representation/thumbnail of the application, how the application state changed through the user's logged interactions.

The user could then select a particular position on the timeline/tree to restore the application to that state. The user could further step backwards or forwards in time from the restored application state as well.

Each time the user restores the application to a previous state, a new branch in the log may be created to track the current activity without destroying older logged information or states.

The log may be searchable both by data accessed and the type of actions taken. The steps taken in a workflow may be more important in some instances than the actual data accessed. Stored/retrieved actions may also be loaded and applied to current data.

The system may generate RURLs to represent the application states. It does not just copy the current URL of the application, even if that URL describes some properties of the content being displayed. The RURL is intended to be able to restore the application's state including all the steps taken by the user in the application to arrive at that state, so that it is possible to navigate historically through the actions used to reach that application state.

The RURL may be generated in various ways: (1) The application may build the RURL; (2) a browser may request state info from the application/service/server that is being interacted with through the browser, and upon receiving a state ID and possibly other arguments/parameters, the browser may then generate the RURL containing that information; and/or (3) the browser may itself build a journal/log of what the user did to get to the particular application state, and may store that locally or transmit it to the application (which may be local or remote).

FIG. 1 is illustrative of a method for duplicating a windowed application view, according to some embodiments.

It may be possible for the second window to be configured to appear with a vertical scrolling position pre-selected to correspond to a vertical scrolling position of the first window. However, the status of any web applications, particularly audio/video streaming applications, or data visualization or navigation applications viewed in the first window will not be maintained to the second window.

In order to solve this technical problem, with reference to the method flow chart of FIG. 1, embodiments provide for the system to generate a second URL, based on the first URL that is shown in the first window, that also includes additional status information. This second window is configured to automatically access the second URL when spawned. The web server that is accessed through the second URL is configured to parse the second URL and pre-configure aspects of the web page for viewing in the second window to match the status of the viewed web page in the first window at the time of duplication.

At 102, the first windowed application view may be maintained, and at 104, duplication may be triggered to cause the duplication of the first windowed application view in a second window. In this example, the second window may be a distinct instance from the first window.

The second window may be configured to maintain any view settings that were active at the time of the duplication, and the second window may be further configured to display a same data set, if any, that was displayed by the first window at the time of the duplication.

For example, if the first window is in the process of streaming a Flash or HTML5 video and has reached a particular playback position in the first window, the web server will initially present the same web page to the second window with the same video playing in the same playback position. For example, a user may have navigated a large chart or graph representing a data set in the first window. The user may have modified the visualization of the graph in the first window to view particular aspects of the data, such as by zooming or highlighting various portions of the data, or by viewing nested aspects of the data.

Duplication, for example, may include generating a Uniform Resource Locator (URL) that is configured to describe the status of contents of the first application view at 106, and using this URL to generate the second windowed application view at 108.

When spawning the second window, the URL generated by the system, when communicated to the web server, may prompt the web server to deliver the web page of the first window with the visualization shown in the same state as the first window. From that point onwards, each window may be controlled independently from one another, to modify views of the visualization.

In order to achieve the functionality described herein, either the web server or the user's computer device may generate the URL for the second window. In some embodiments, certain state information about web applications viewed in the first window of the web browser application may not be known to the user's computer device, or to the computer server. For example, the user's computer device may be configured to retrieve state information of the web applications from local memory and send some or all of the state information to the web server. The web server may then associate that state information with a temporary or saved session of the first window, and may further generate a URL that when sent to the web server would prompt the web server to retrieve the associated state information.

To duplicate the first windowed application view, the URL can be automatically accessed at 110 such that the second windowed application view is configured to match the first windowed application view. For example, the web server may then send the URL to the user's computer device. The second window may be spawned and may be configured to automatically access the URL, prompting the web server to retrieve the associated state information, and communicate with the second window to render the web page in accordance with the state information, thereby producing a duplicate view of the first window.

In some embodiments, the generated URL may also be stored for later use in order to quickly reproduce a web browsing state dictated by the URL. In some embodiments, one or more web browser application cookies may also be employed in connection with the generated URL in order to maintain some view settings from the first window that may be propagated to the second window through the cookie(s).

After creation of the second window, each of the first window and the second window may be separately modified or otherwise controlled by the user without necessarily affecting any aspects of the other window. Optionally, after duplicating the first window, both the first and second windows may be resized to appear side-by-side with one another on the display. In this example, the embodiment may be implemented in a browser application, such as a web browser like Mozilla™ Firefox™ or Google™ Chrome™.

Figure 2:
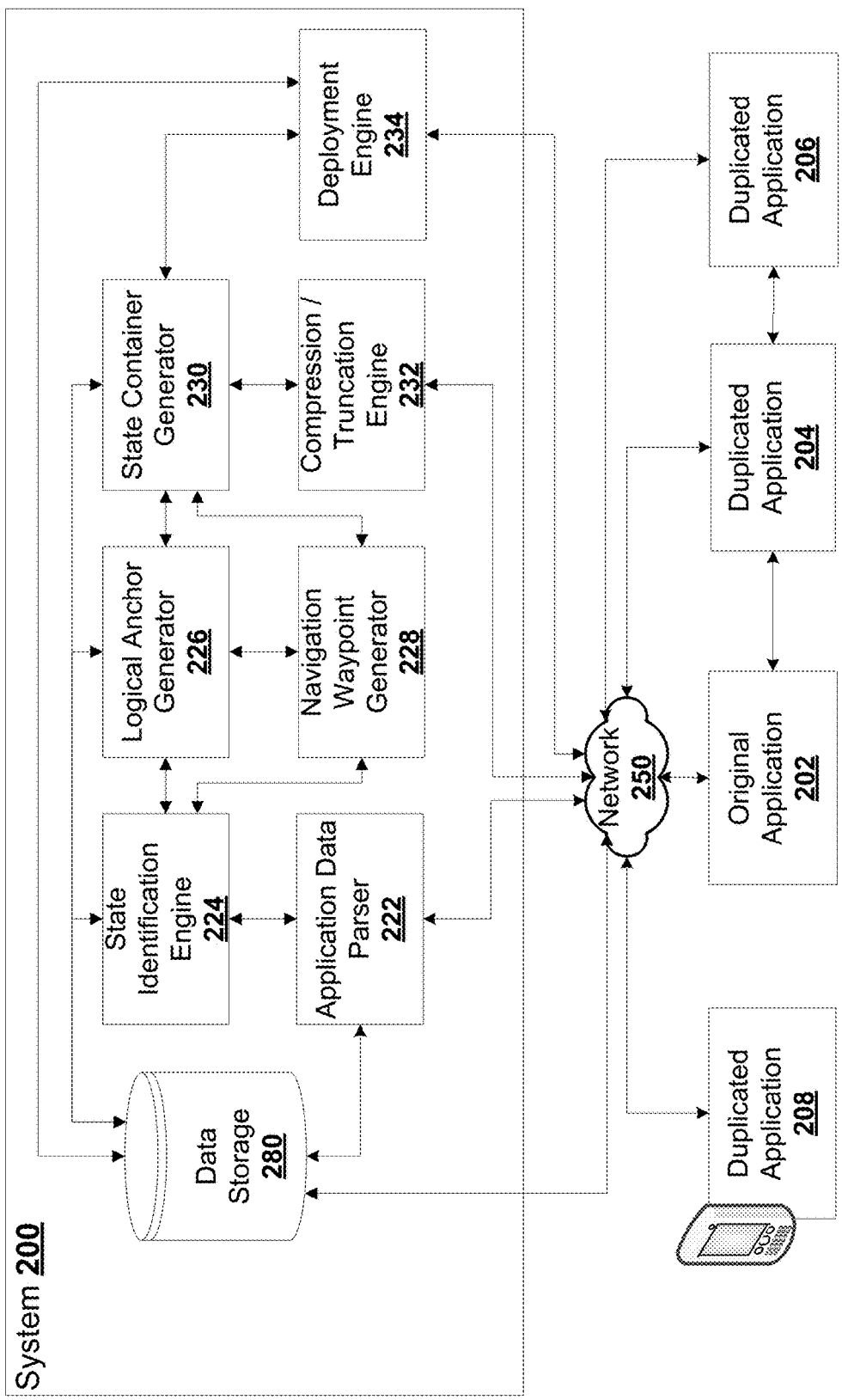
FIG. 2 is illustrative of a sample system configured for duplicating an original application into one or more duplicated applications, in accordance with some embodiments.

FIG. 2 is illustrative of a sample system 200 configured for duplicating an original application 202 into one or more duplicated applications 204-208, in accordance with some embodiments.

The duplicated applications are shown as examples and there may be more, less, or different duplicated applications. Application 208 is shown with a mobile device to depict the scenario where the duplication is performed on a different type of device (e.g., a user duplicating an application for use on a mobile device).

The system 200 may, for example, be located in various environments, depending on architecture and topologies. For example, system 200 may reside directly on an originating device or a target device, or on a third party server or networked distributed resources that are utilized to coordinate the transfer. Where a third party server or distributed resources are utilized, they may act as intermediary computing devices.

System 200 may include an application data parser 222, a state identification engine 224, a logical anchor generator 226, data storage 280, a navigation waypoint generator 228, a state container generator 230, a compression/truncation engine 232, a deployment engine 234, among others. Data storage 280 may be a non-transitory computer readable medium configured to store state information of the original application for provisioning onto the duplicated application (s). Data storage 280 may store such information in the form of flat files, database records, linked lists, or in other data structures.

Application data parser 222 may be configured to receive underlying code or parameters for a particular original application 202. In the context of web browser applications, the underlying code may be the markup language used for presentment of the application. In the context of other applications, the underlying code may be source code or parameters that are used to define the functioning of the application.

State identification engine 224 may be configured to, based on the parsed application data, determine a current state of the original application through analyzing a set of identified parameters and variables (e.g., inputs, selections, tracked information). The state may be defined, for example, as being encompassed by the entirety of the set of identified parameters or variables, or a reduced set of identified parameters or variables that are sufficient to define the state for duplication. In some embodiments, the state identification engine 224 is configured to replicate secured access parameters, including, for example, access keys, credentials, certificates, encryption keys, among others.

Logical anchor generator 226 may be configured to utilize the identified current state to generate one or more logical anchor parameters that are configured for replication of the identified state. For example, the parameters, variables, etc., may be bundled together or logically combined or transformed for ease of duplication. Where order is important in duplication, the logical anchor parameters may be organized and/or tagged such that the duplication will require the processing of the logical anchors in a particular order.

Navigation waypoint generator 228 may be configured to track parameters or variables in the application relating to the usage history of the original application. For example, the original application may have metadata or other data stored that describe a predetermined number of prior actions taken by a user (e.g., for the purposes of "undoing" or "re-doing" commands), and such information may also be transferred as part of the duplication process such that a user is able to also conduct "undo" operations from the duplicated application.

State container generator 230 may be configured to generate one or more containers of parameter information that can be deployed by deployment engine 234. The containers may be, for example, data files including sequential instruction sets, among others. A specific technical challenge that may arise is a need to efficiently and seamlessly duplicate or otherwise replicate the application despite known or predicted constraints. Various trade-offs may be conducted to vary the completeness of information transferred in view of resource constraints. The state containers, in some embodiments, are specifically configured URLs that act as containers (e.g., Replication URLs or RURLs). In some embodiments, the state containers are not stored on data storage 280, and are rather stored locally on duplicated applications 208 for periodic updates, etc.

Compression/truncation engine 232 may be configured to, in some embodiments, to reduce the state container such that information may be removed or compressed prior to transmission to the device that will host the duplicated application.

The compression/truncation engine 232 may be useful, for example, where limited bandwidth or storage space is available, and the information may require transformation before transmission. In some embodiments, the duplication or otherwise replication may involve a large set of information to be transferred, and accordingly, the information set may be compressed, truncated, or otherwise transformed such that the information may be transferred in view of limited available bandwidth or time constraints. The type of compression, truncation, or transformation may be determined dynamically, for example, based on sensed network conditions, availability of computing resources, processing time constraints, known business requirements, among others. In some embodiments, the compression/truncation engine 232 is configured for encrypting state data, including sensitive state information (e.g., client information, confidential information).

The compression/truncation engine 232 may be configured for the encoding of data in an efficient form (such as binary vs ASCII), Compression of strings and data (zip, etc.), for the referencing commonly accessible reference files and dictionaries. If the copy of the window/application has access to a shared reference resource, or has copies of key reference data, the RURL can be adapted to refer to the reference data rather than copying it.

Often in sessions the user only provides limited input, key stroke, mouse clicks, etc., but these "commands" can have a profound effect on the display or the underlying data based on what processing the application does using the user input. Therefore, it some cases it is more efficient to pass a "journal" of user input as part of the RURL directly or indirectly, and then to have the new instance of the application run through the journal, rather than trying to create a copy of the complete new state of the application or of the underlying data.

The deployment engine 234 is invoked to utilized the information provided by way of the state container to regenerate the original application in the form of the duplicated application by first launching the application on a target device, and then utilizing the state container's parameters to reconstruct or reconfigure the application to match the recorded state of the original application. Where modifications are required due to shifts in environment (e.g., different operating system, form factor, input/output availability, drivers, network configuration, resolution, color scheme), the deployment engine 234 may dynamically modify the instructions as it deploys the duplicated application.

FIGS. 3A, 3B, 3C are illustrative of various architectures that may be utilized in different embodiments. FIG. 3A is illustrative of an example direct application to application transfer, which may occur on a single device or between multiple devices. Original application 302 is used to spawn duplicated application 304 without the use of an intermediary. FIG. 3B is illustrative of an architecture where server 310 serves as the intermediary between an original application 306 and a duplicated application 308. State information is recorded and transmitted of the server 310, which then manages the provisioning of the duplicated application 308. FIG. 3C is similar to FIG. 3B except that a network 350 is used in communicating with a set of distributed computing resources 310A (e.g., a "cloud" implementation), which act in concert as an intermediary for provisioning of the duplicated application 308.

Figure 4:
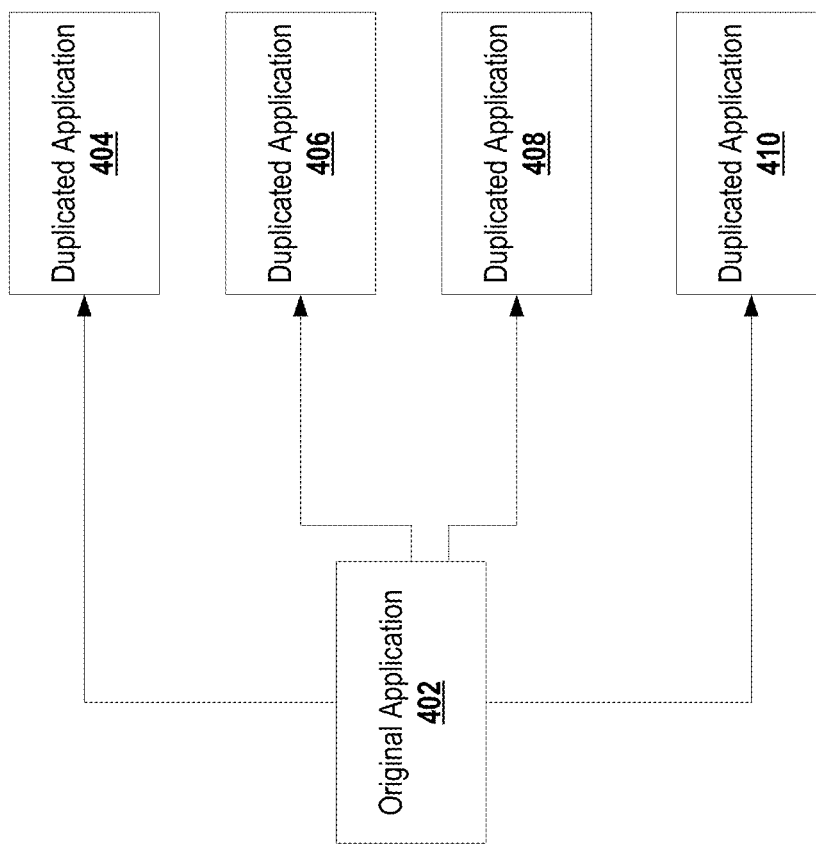
FIG. 4 is illustrative of a scenario wherein duplication and/or replication may be conducted in a 1:n configuration, according to some embodiments.

FIG. 4 is illustrative of a scenario wherein duplication and/or replication may be conducted in a 1:n configuration, according to some embodiments. In FIG. 4, one original application 402 may be used to spawn multiple child applications 404-410, which may be provided on a homogenous set of devices, or a heterogeneous set of devices.

Figure 5:
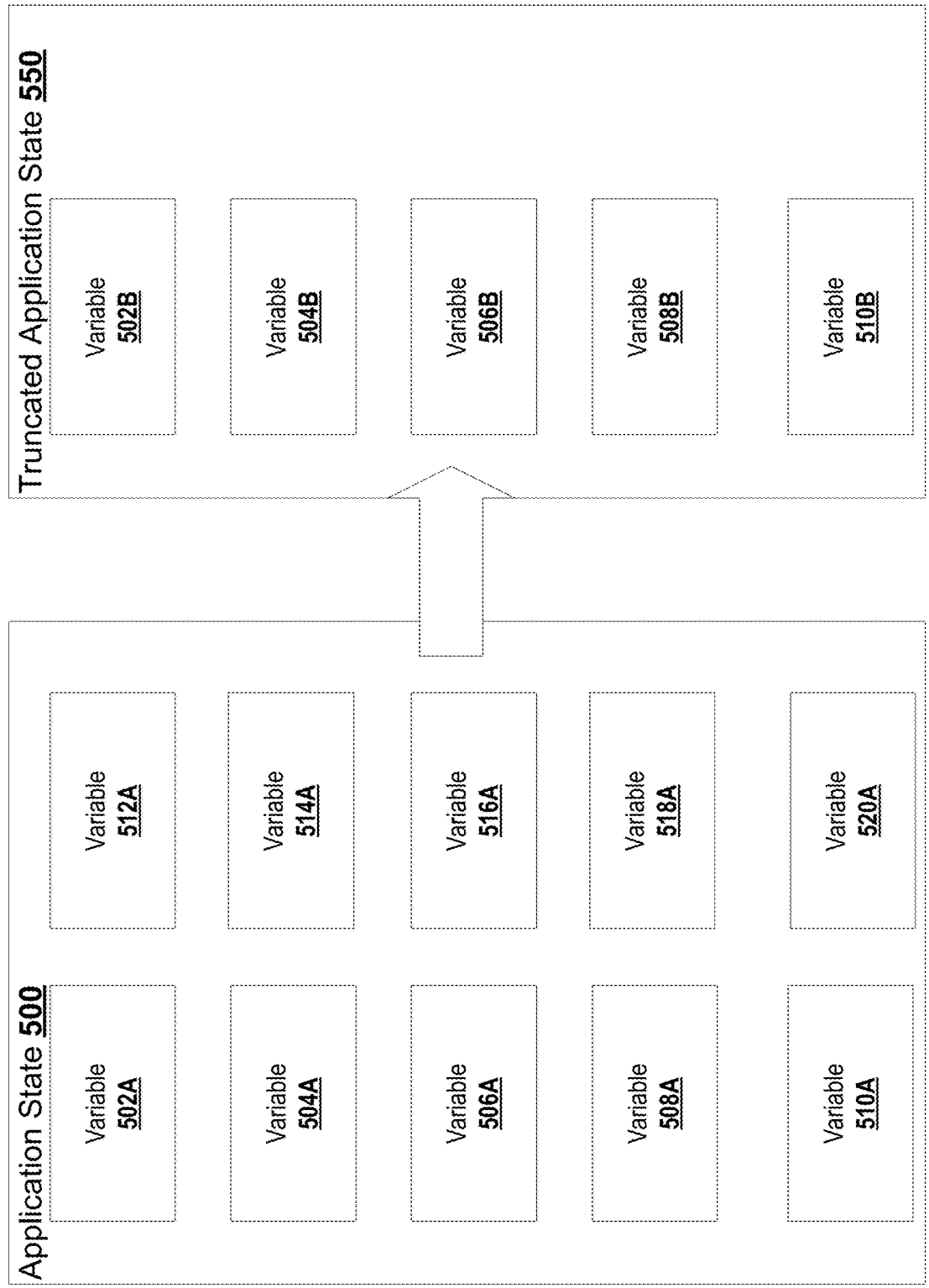
FIG. 5 is illustrative of an uncompressed application state that is transitioned to a compressed application state, according to some embodiments.

FIG. 5 is illustrative of an uncompressed application state 500 that is transitioned to a compressed application state 550, according to some embodiments. As illustrated in FIG. 5, variables 502A-520A may be compressed and/or otherwise transformed such that a smaller set of variables (e.g., 502B-510B) is able to fully describe the state underlying application state 500.

Such an approach may, however, increase the amount of computing power required to regenerate the state using the state variables 502B-510B.

Figure 6:
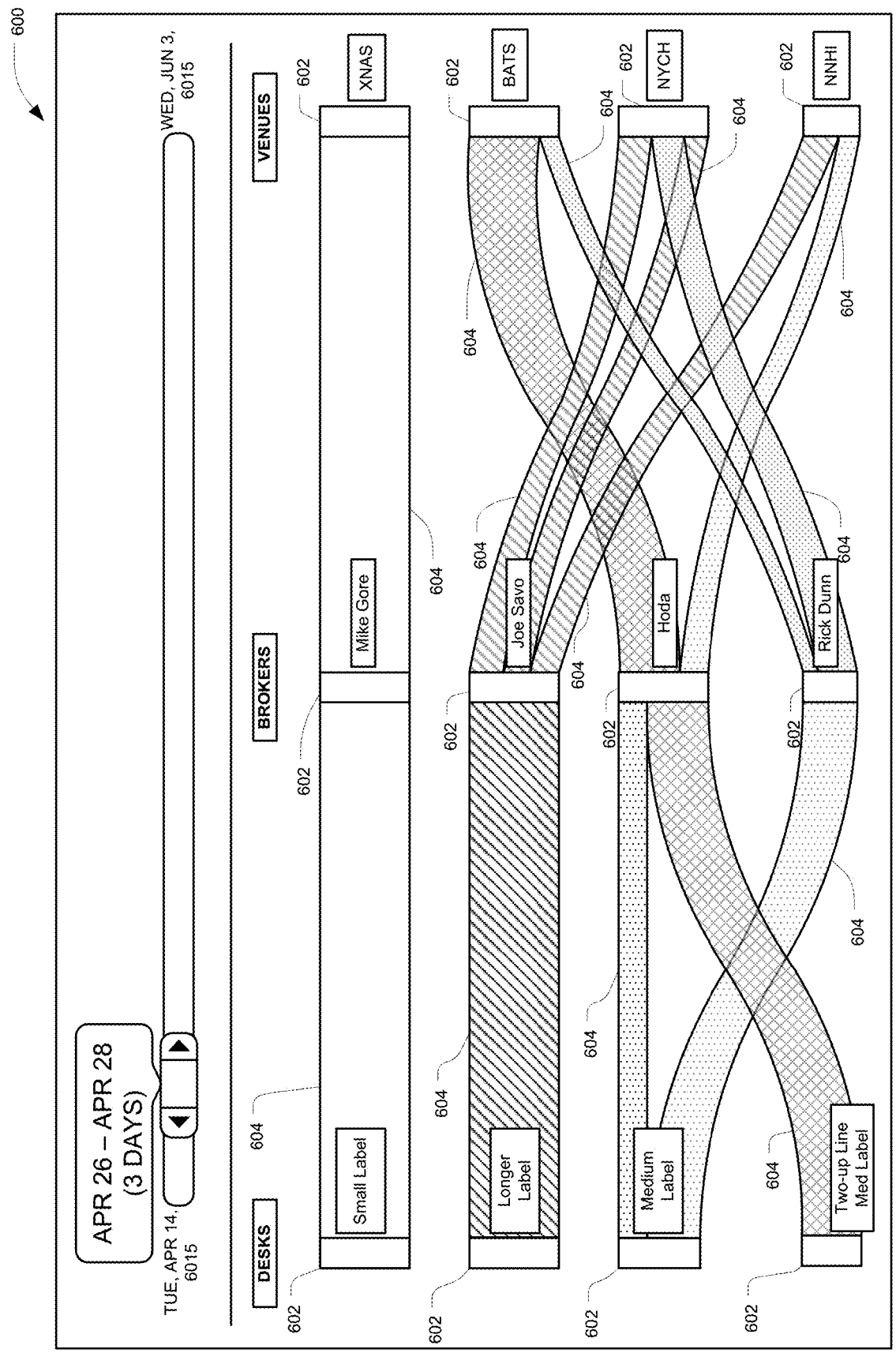
FIGS. 6-8 are illustrative of example Sankey diagrams.
Figure 7:
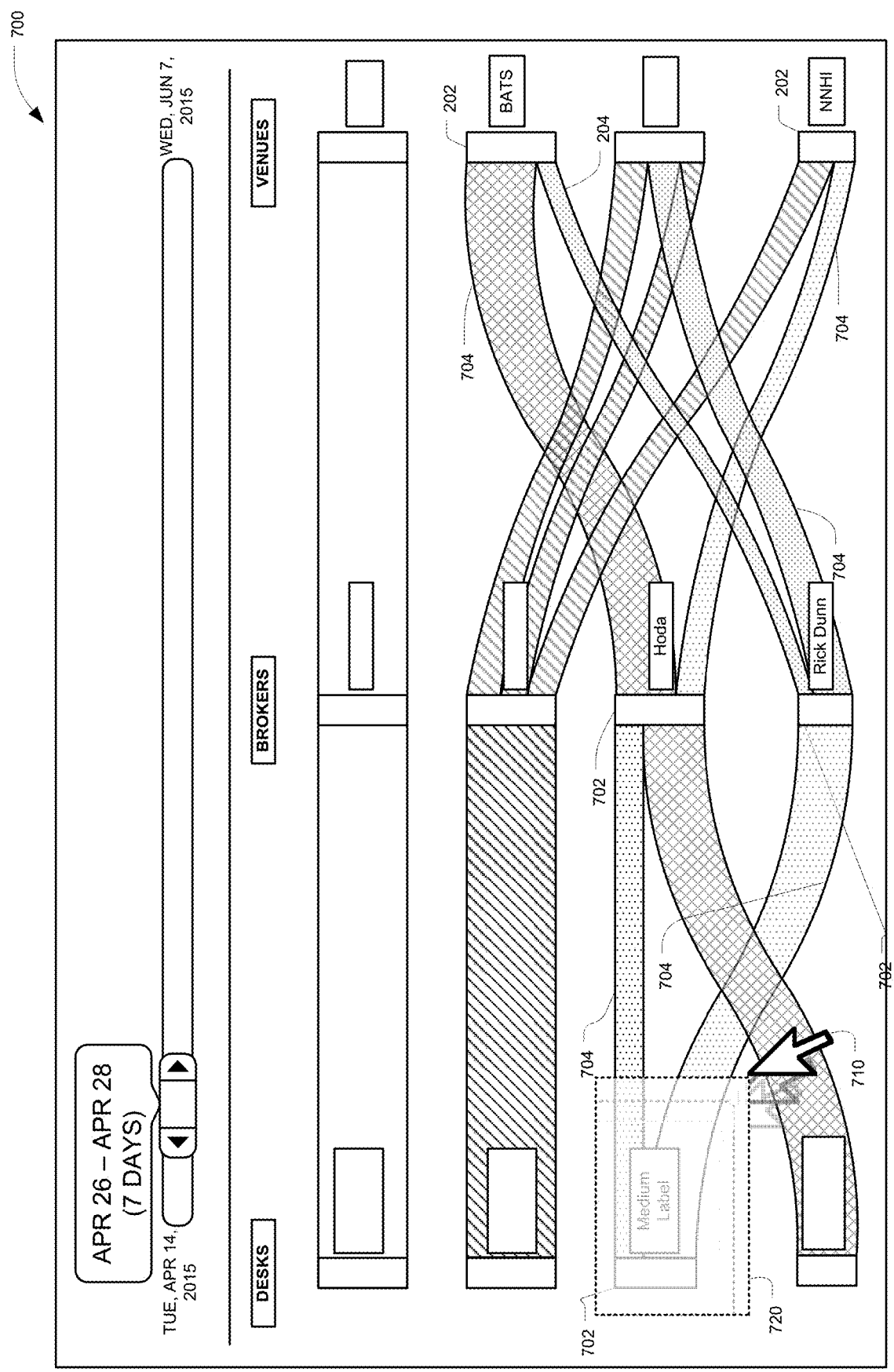
Figure 8:
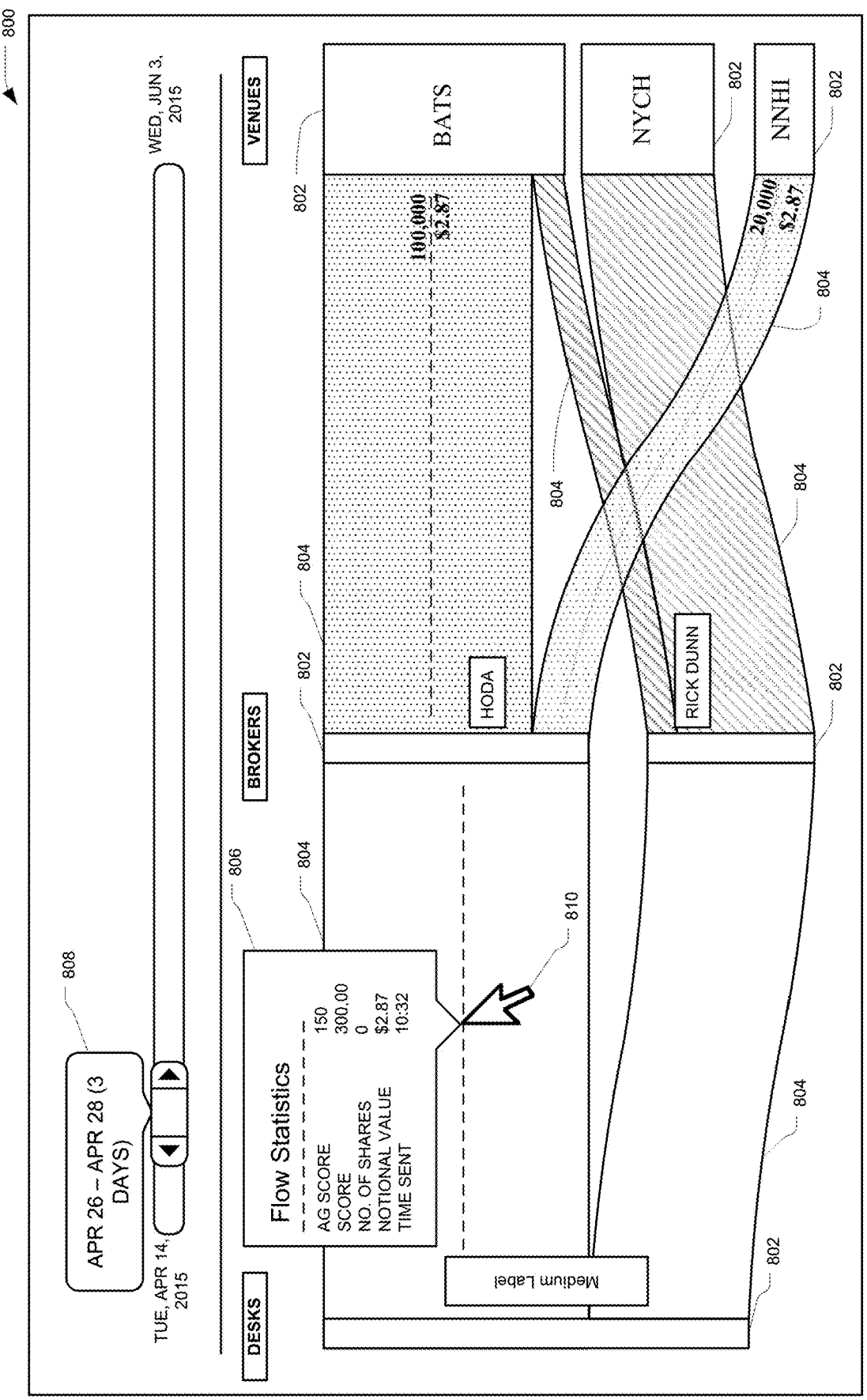

Various example Sankey diagrams are provided at FIGS. 6-8. A user may be viewing a Sankey diagram in a browser on his computer at a trading desk. The Sankey diagram may be being used to compare trading flows for a particular order router or routers, and may be provided in the form of an application (the original application) that takes into consideration the position of a pointer (e.g., as controlled by a mouse) in determining how information is presented to the user through a graphical interface. There may be a high degree of customization on the Sankey diagram—for example, the application hosting the Sankey diagram may allow for configured views based on user inputs, for example, showing a close up of trading flow in a duration or type of order, etc.

Figure 9:
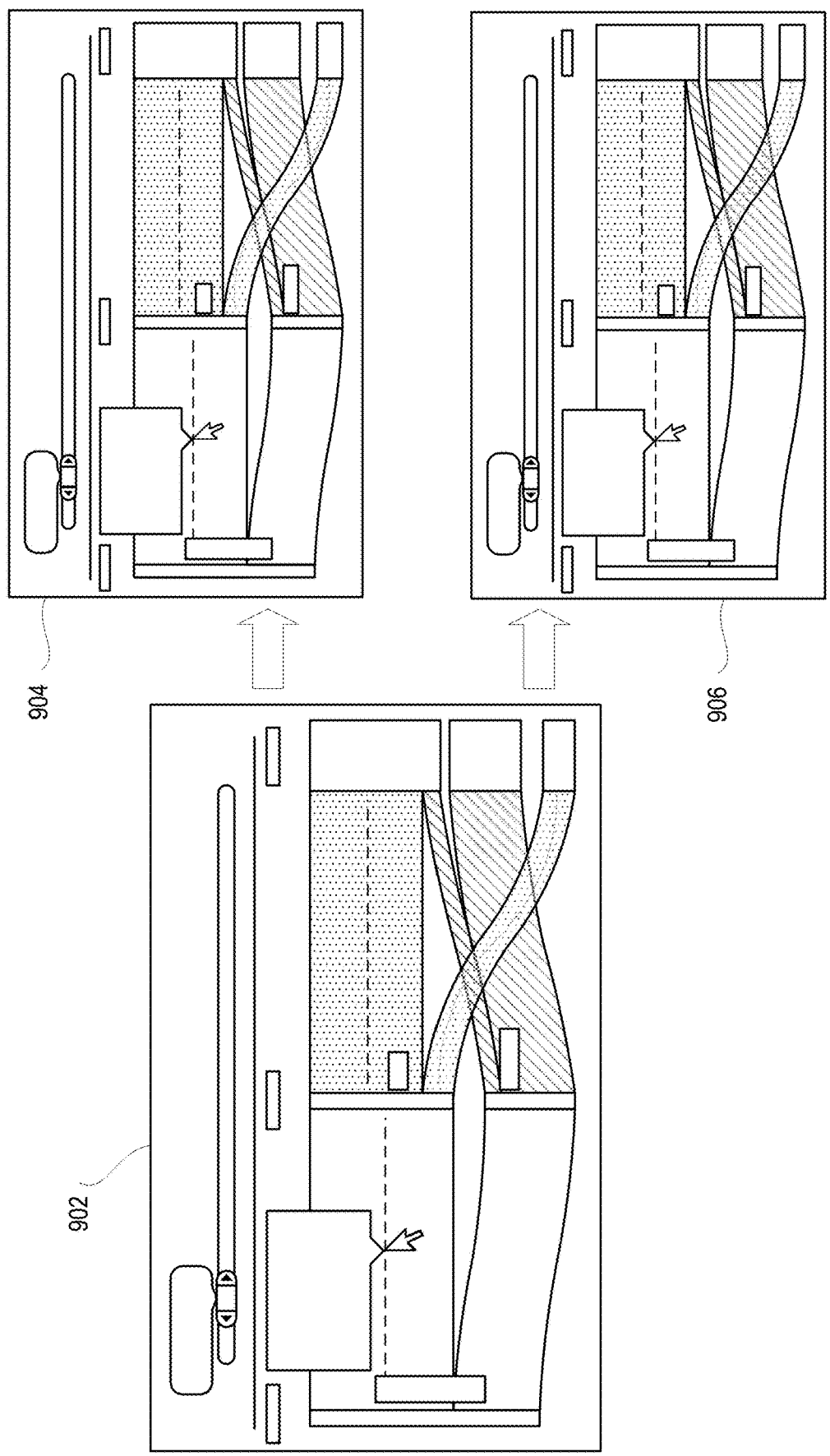
FIG. 9 is illustrative of an original application being replicated into replicated applications.

Customizations on the Sankey diagrams are illustrated using reference numerals 602-604, 702-720, 802-820. In FIG. 8, 810 shows the position of a mouse cursor, and 806 is illustrative of information that is presented to the user based on the specific position of the mouse cursor 810. These customizations are maintained during the replication of the state such that a replicated application does not only show the same Sankey diagram, but also shows the additional information that is presented to the user. FIG. 9 is illustrative of an original application 902 being replicated into replicated applications 904 and 906.

As a workflow example in relation to the Sankey diagram of FIGS. 6-8 to be replicated in a manner of FIG. 9, a user may begin the replication process using a configured Sankey view. This view can be initially configured, for example, by a selection of the "Sankey" View from a main curtain menu The Sankey page appears (defaulting the view to the most current single day), and the user then changes the time slider width to encompass a 2 week interval. Then the user hits the play button to play through the historical data displaying 2 week intervals. The user sees something interesting and pauses the play—freezing on a single 2 week interval somewhere in the middle of the full time interval.

The user clicks on the right side on one of the bands between the XYZ trading platform and the NYSE exchange. The display changes to show just the band on the right side between XYZ and NYSE, and on the left all of the parent orders that correspond to the child orders in the band from all the corresponding desks for the same 2 week interval where the original Sankey replay was paused. The user then clicks on one of the bands on left and the GUI displays the tabular view of all the 280 orders corresponding to the order flow in the band. The default view is the list of summary orders. The user scrolls down to a specific order for symbol ACORP which is ¾ of the way down the list of 280 summaries. The user then clicks on the order, to drill down to the parent orders which included 2 replaces and then finally a cancel. The user clicks on the second replace order, to drill down to the 155 child orders that the XYZ trading platform generated in response. The user scrolls down to the last order that was sent to NYSE near the bottom of the list and clicks on it to drill down to the 4 fills resulting from the child order. The user clicks on the last fill which to see the corresponding fix message and determines that it executed on the closing auction.

The user finds this interesting because he thinks it explains why the parent order was not fully filled but he wants his head trader to verify what happened. So he clicks the "Replicate" icon.

The GUI creates a new window with a new RURL. What actually happened is the GUI sent a "Save state" message to the web server and the application. The application was logging the user session so it was able to generate a session log file that contained the following list of information:

The original Sankey screen selection along with the width and position of the time slider at the point is maintained where the playback was paused. The second Sankey screen selection of just the band between XYZ and NYSE with the 2 week interval is maintained. The tabular screen selection, with the ID of the selected summary order, the selected parent replace order, the selected child order, and the selected fill is maintained. The application generates an RURL that contains the ID of the log file and sends it back to the user's browser and that is what the browser uses to open the new window.

The user can copy the RURL from the new window and send the RURL via email or instant messaging, or other communication method to his head trader.

The head trader can open up the trading application in his browser, and cut & paste the RURL he received into the browser. The first screen the head trader will see is the drill down tabular view with the opened up FIX message for the fill that the first user was looking at.

When the head trader looks at the order, he decides that the problem was not with the final child order being sent to NYSE and executing at the closing auction because the time stamp on the last replace parent was at 3:59:20 just seconds before the close and the replace actually reduced the quantity on the order.

Since the head trader now has an equivalent session, he can go back through it and see that the problem was with the original order that was placed just after 2:00 pm but with a limit price that was just out of the market so it only executed a few hundred shares around 2:30 when there was a brief market fluctuation.

The head trader then tries to get a high level view of what is going on, backs up through the session to the second Sankey and sees that there were 2 desks that were sending order to the XYZ trading platform. However, when he hovers the mouse over the two bands he sees that the first desk (which was the one that sent the order in question) has a relatively large order volume count but with only 15% of the order volume actually getting filled. The second desk has only half the order volume but with an 95% fill rate.

By then drilling down into the order flow of the first desk he sees that that trader tends to send orders that are just out of the market hoping to get price improvement during the trading day, so it's not unusual for him to have remaining unfilled quantities. The head trader then backs up to the first Sankey view, clicks just on the desk that he is focusing on, and then replays the Sankey view for just the single desk to see if this is consistently typical for that desk trader. This was an example work flow that took advantage of having the full state of the application conveyed from one user to another.

In a legacy browser, even assuming a "verbose" URL paradigm that fully describes what is on the screen, when the first user sends the URL to the second user, the second user would only be able to display the last page showing the fill. The second user would not have been able to back through the browser to the Sankey, nor would he be able to determine the time interval used by the first user, etc.

Figure 10:
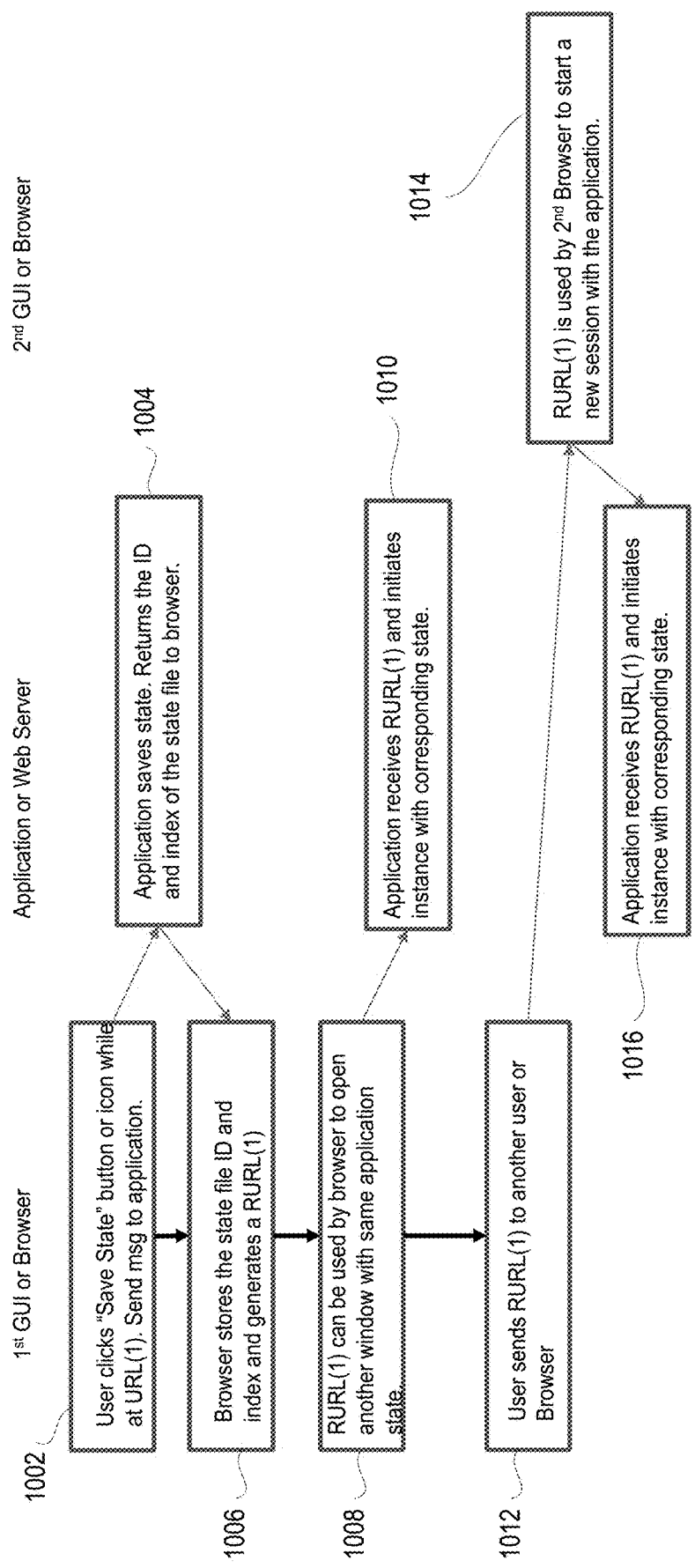
FIG. 10 is an example method, according to some embodiments.

FIG. 10 is an example method, according to some embodiments. This flow chart illustrates a scenario using a URL/RURL approach where the application is running on a separate server. The application stores the state in a state file (e.g., as the form of a container). When the GUI requests a state save operation at 1002, the application saves the current state of the session into a file and returns the ID of the file and the index into it (e.g., the index is an indicator of where the current state of the application is located in the file, thus the file can be generating a log or journal, and can have any number of indexed locations each representing a saved state) at 1004. The browser can use the file id and index to generate an RURL at 1006 which is a URL with the replication state information added to it at 1008. The RURL can then be used to start another window or browser session with the same application state or it can be sent to a different browser on potentially a different computer or machine at 1010. A browser can open the session using the RURL, and when received the application can find the state file that is corresponding to the id and index and generate an identical or equivalent application state.

There are variations to this approach. Some examples: A user's computing device may transmit the RURL to another user or another browser at 1012. At 1014, the RURL may be utilized to generate a new session with the application on the second GUI or browser, and the RURL can be used to the application or webserver at 1016. Accordingly, a multitude of replicated states may be generated.

In another variation, rather than sending the state file id and index back to the browser, the application is configured to generate the RURL and to communicate the RURL back to the browser.

In another variation, the application may be configured to send the entire state file or data back to the browser allowing the browser to store it locally. When the browser uses the RURL, it sends the corresponding state file to the application or server. The advantage of this approach is that web or application servers do not need to store state files for potentially huge numbers of users. This approach can also support having multiple independent application instances that do not share state file information to be able to operate since each would receive a state file from the browser and would not be required access it from another server or some shared access storage facility. Also no authentication scheme would be required since the users manage who has a copy of the RURL and associated state data/files.

When the RURL is passed to the application server, it can generate a new application instance per browser sessions, or it can connect the browser to the existing session and allow it to interact with the original session (basically allowing it to interact with the same application and/or data set). This can be useful if you want to allow multiple users to access and modify/update the same data set or library.

When the state is saved, the browser can do this automatically from the data that is being logging or journaled based on the user's input, key strokes, mouse movements and clicks, etc. This information can be used to generate a RURL that either can contain all of the state information embedded in it, or it points to a state file generated by the browser. If the RURL is to be sent to a different server, then the state file would have to be packaged and sent along with it. Even though this scheme seems complicated, it allows this feature to be implement in the browser and to operate with applications that do not support this feature directly.

It will be appreciated that any module or component exemplified herein that executes instructions may include or otherwise have access to computer readable media such as storage media, computer storage media, or data storage devices (removable and/or non-removable) such as, for example, magnetic disks, optical disks, tape, and other forms of computer readable media. Computer storage media may include volatile and non-volatile, removable and non-removable media implemented in any method or technology for storage of information, such as computer readable instructions, data structures, program modules, or other data. Examples of computer storage media include RAM, ROM, flash memory or other memory technology, CD-ROM, digital versatile disks (DVD), blue-ray disks, or other optical storage, magnetic cassettes, magnetic tape, magnetic disk storage or other magnetic storage devices, or media which can be used to store the desired information and which can be accessed by an application, module, or both. Computer storage media may be part of the mobile device, tracking module, object tracking application, etc., or accessible or connectable thereto. Applications or modules herein described may be implemented using computer readable/executable instructions that may be stored or otherwise held by such computer readable media.

Figure 11:
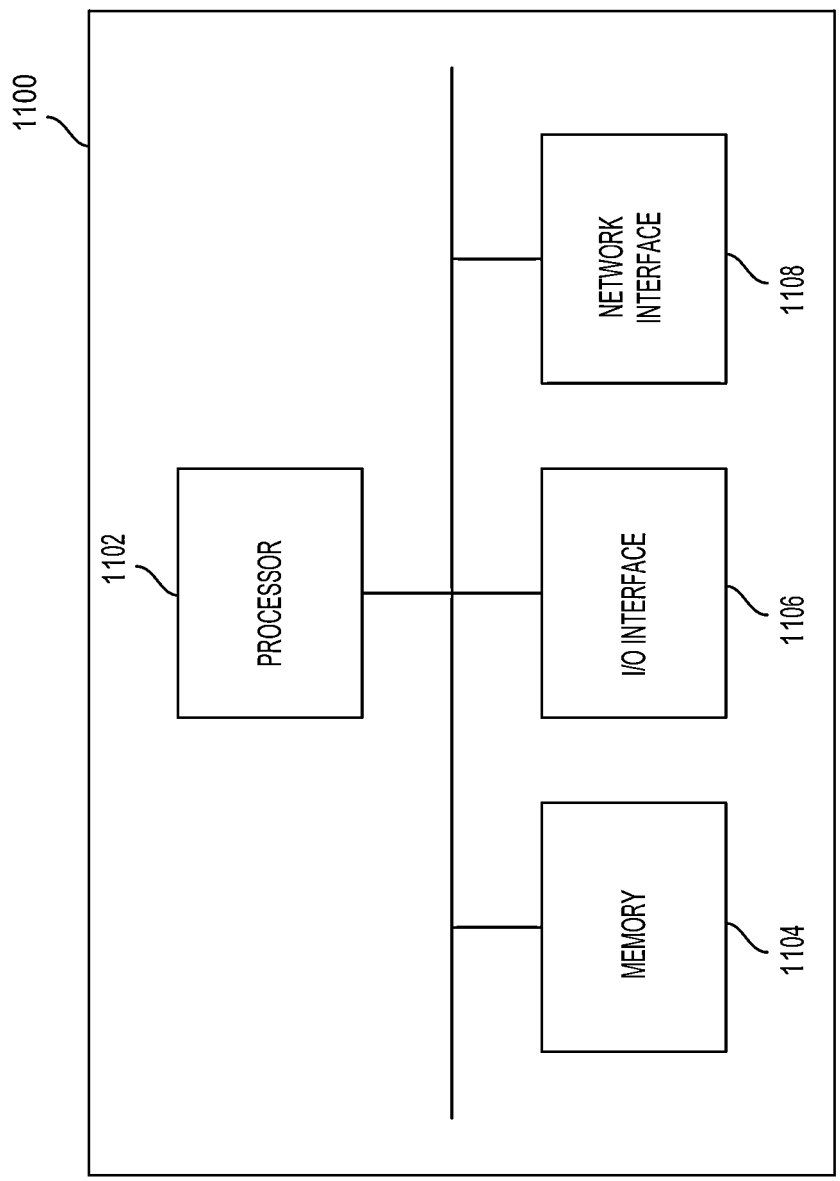
FIG. 11 is an example computing device, according to some embodiments.

FIG. 11 is a schematic diagram of computing device 1100, exemplary of an embodiment. As depicted, computing device includes at least one processor 1102, memory 1104, at least one I/O interface 1106, and at least one network interface 1108.

Processor 1102 may be an Intel or AMD x86 or x64, PowerPC, ARM processor, or the like. Memory 1104 may include a suitable combination of any type of computer memory that is located either internally or externally such as, for example, random-access memory (RAM), read-only memory (ROM), compact disc read-only memory (CDROM), or the like.

Each I/O interface 1106 enables computing device 1100 to interconnect with one or more input devices, such as a keyboard, mouse, camera, touch screen and a microphone, or with one or more output devices such as a display screen and a speaker.

Each network interface 1108 enables computing device 1100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device 1100 is operable to register and authenticate users (using a login, unique identifier, and password for example) prior to providing access to applications, a local network, network resources, other networks and network security devices. Computing devices 1100 may serve one user or multiple users.

It is to be understood that embodiments are not limited in its application to the details of construction and to the arrangements of the components set forth in the description or illustrated in the drawings. Other embodiments are possible and can be practiced and carried out in various ways. Also, it is to be understood that the phraseology and terminology employed herein are for the purpose of description and should not be regarded as limiting. In the drawings, embodiments are illustrated by way of example. It is to be expressly understood that the description and drawings are only for the purpose of illustration and as an aid to understanding, and are not intended as a definition of the limits of embodiments.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

The invention claimed is:

1. A computer-implemented method for duplicating an application state, the method comprising:
   recording one or more point-in-time characteristics generated by prior user inputs at one or more user interface elements, the one or more point-in-time characteristics associated with a first application state of a first application instance, the recording comprising:
      parsing underlying code of the first application instance to identify the one or more point-in-time characteristics generated by the prior user inputs that led to the first application state; and
      provisioning memory resources to support a second application state;

transferring the one or more point-in-time characteristics to the provisioned memory resources for generating the second application state;

storing the prior user inputs in a journal, wherein the journal is configured to enable reproduction of a respective application state based on each of a plurality of modified states of the first application instance, each respective application state from the plurality of modified states based on at least a subset of the one or more point-in-time characteristics generated by the prior user inputs;

generating, using at least one of the stored prior user inputs in the journal, a second application instance having the second application state based on a first subset of the one or more point-in-time characteristics;

configuring the second application state based on the first subset of the one or more point-in-time characteristics to duplicate the first application state of the first application instance; and wherein the generated second application instance has a subset of state information from the first application state of the first application instance based on the first subset of the one or more point-in-time characteristics.

2. The method of claim 1, wherein the recording of the one or more point-in-time characteristics comprises generating a uniform resource locator (URL) adapted to store at least (i) application information and (ii) one or more status information data elements;

wherein the recording comprises initiating a copy of the first application instance, wherein the application information is interpreted during the initiating to determine which application to initiate; and wherein the one or more status information data elements are interpreted during the transferring to convey state information for the second application instance.

3. The method of claim 1, wherein the first application instance includes at least one application subcomponent.

4. The method of claim 3, wherein the application subcomponent consists of a component selected from the group comprising of Flash, Hypertext Markup Language 5 (HTML5), Asynchronous JavaScript and XML (AJAX), PHP; Hypertext Preprocessor (PHP), and ActiveX components.

5. The method of claim 1, wherein the first application state is provided in relation to at least one of a group comprising a Sankey graph, a bubble graph, and a transaction view.

6. The method of claim 1, wherein the first application state is hosted within a secure session, the method further comprising:

duplicating one or more security credentials from the first application state to the second application state of the second application instance.

7. The method of claim 1, wherein at least one of the one or more point-in-time characteristics is representative of one or more customizations to one or more graph display components.

8. The method of claim 1, wherein each of one or more point-in-time characteristics is representative of a corresponding plurality of one or more customizations to one or more graph display components.

9. The method of claim 1, wherein each of the one or more point-in-time characteristics is updated periodically to match modifications to the first application state over a period of time.

10. The method of claim 2, wherein the first application instance is associated with the URL to spawn the second application instance.

11. A computer-implemented system configured for duplicating an application state, the system comprising:

a processor;

a memory coupled to the processor and storing processor readable instructions that, when executed, configure the processor to:

record one or more point-in-time characteristics generated by prior user inputs at one or more user interface elements, the one or more point-in-time characteristics associated with a first application state of a first application instance, the recording comprising:

parsing underlying code of the first application instance to identify the one or more point-in-time characteristics generated by the prior user inputs that led to the first application state; and provisioning memory resources to support a second application state;

transfer the one or more point-in-time characteristics to the provisioned memory resources for generating the second application state;

store the prior user inputs in a journal wherein the journal is configured to enable reproduction of a respective application state based on each of a plurality of modified states of the first application instance, each respective application state from the plurality of modified states based on at least a subset of the one or more point-in-time characteristics generated by the prior user inputs;

generate, using at least one of the stored prior user inputs in the journal, a second application instance having the second application state based on a first subset of the one or more point-in-time characteristics;

configure the second application state based on the first subset of the one or more point-in-time characteristics to duplicate the first application state of the first application instance; and wherein the generated second application instance has a subset of state information from the first application state of the first application instance based on the first subset of the one or more point-in-time characteristics.

12. The system of claim 11, wherein the processor readable instructions, when executed, configure the processor to record the one or more point-in-time characteristics by generating a uniform resource locator (URL) adapted to store at least (i) application information and (ii) one or more status information data elements;

wherein the recording comprises initiating a copy of the first application instance, wherein the application information is interpreted during the initiating to determine which application to initiate; and wherein the one or more status information data elements are interpreted during the transferring to convey state information for the second application instance.

13. The system of claim 11, wherein the first application instance includes at least one application subcomponent.

14. The system of claim 13, wherein the application subcomponent consists of a component selected from the group comprising of Flash, Hypertext Markup Language 5 (HTML5), Asynchronous JavaScript and XML (AJAX), PHP: Hypertext Preprocessor (PHP), and ActiveX components.

15. The system of claim 11, wherein the first application state is provided in relation to at least one of a group comprising a Sankey graph, a bubble graph, and a transaction view.

16. The system of claim 11, wherein the first application state is duplicated to a second device from the first application state that is hosted on a first device.

17. The system of claim 11, wherein the first application state is hosted within a secure session, the processor readable instructions, when executed, configure the processor to:
duplicate the one or more security credentials from the first application state to the second application state of the second application instance.

18. The system of claim 11, wherein each of the one or more point-in-time characteristics is representative of a corresponding plurality of one or more customizations to one or more graph display components.

19. The system of claim 11, wherein each of the one or more point-in-time characteristics is updated periodically to match modifications to the first application state over a period of time.

20. A computer-implemented non-transitory computer readable medium storing computer readable instructions, which when executed, cause a processor to perform:
recording one or more point-in-time characteristics generated by prior user inputs at one or more user interface elements, the one or more point-in-time characteristics associated with a first application state of a first application instance, the recording comprising:
parsing underlying code of the first application instance to identify the one or more point-in-time characteristics generated by the prior user inputs that led to the first application state; and
provisioning memory resources to support a second application state;
transferring the one or more point-in-time characteristics to the provisioned memory resources for generating the second application state;
storing the prior user inputs in a journal, wherein the journal is configured to enable reproduction of a respective application state based on each of a plurality of modified states of the first application instance, each respective application state from the plurality of modified states based on at least a subset of the one or more point-in-time characteristics generated by the prior user inputs;
generating, using at least one of the stored prior user inputs in the journal, a second application instance having the second application state based on a first subset of the one or more point-in-time characteristics;
configuring the second application state based on the first subset of the one or more point-in-time characteristics to duplicate the first application state of the first application instance; and
wherein the generated second application instance has a subset of state information from the first application state of the first application instance based on the first subset of the one or more point-in-time characteristics.

* * * * *